(12) United States Patent
Wegener

(10) Patent No.: US 7,665,796 B2
(45) Date of Patent: Feb. 23, 2010

(54) FUNCTIONAL DEVICE WITH PIVOTABLE ELEMENT

(75) Inventor: Fritz Wegener, Gilching (DE)

(73) Assignee: HS Genion GmbH, Krailling (DE)

( * ) Notice: Subject to any disclaimer, the term of this patent is extended or adjusted under 35 U.S.C. 154(b) by 0 days.

(21) Appl. No.: 11/954,256

(22) Filed: Dec. 12, 2007

(65) Prior Publication Data

US 2008/0179914 A1    Jul. 31, 2008

(30) Foreign Application Priority Data

Dec. 12, 2006    (DE)    ........................ 10 2006 058 561

(51) Int. Cl.
*B62D 37/02*    (2006.01)
*B62D 35/00*    (2006.01)

(52) U.S. Cl. .................. 296/180.1; 296/180.3; 180/903

(58) Field of Classification Search .............. 296/180.3, 296/180.5, 180.1; 105/1.3; 180/903; 244/213–216
See application file for complete search history.

(56) References Cited

U.S. PATENT DOCUMENTS

| 2,172,370 | A | * | 9/1939 | Fahrney | ...................... 244/211 |
| 4,629,240 | A | * | 12/1986 | Dornier | .................... 296/180.5 |
| 4,810,022 | A | * | 3/1989 | Takagi et al. | ............. 296/180.5 |
| 5,120,105 | A | * | 6/1992 | Brin et al. | ................ 296/180.5 |
| 5,141,281 | A | * | 8/1992 | Eger et al. | ............... 296/180.5 |
| 5,165,751 | A | * | 11/1992 | Matsumoto et al. | ...... 296/180.5 |
| 5,735,485 | A | * | 4/1998 | Ciprian et al. | .............. 244/113 |
| 6,520,557 | B2 | * | 2/2003 | Benthaus et al. | .............. 296/76 |
| 6,520,564 | B1 | * | 2/2003 | Liang | ...................... 296/180.5 |
| 6,805,399 | B1 | * | 10/2004 | Brown et al. | ............. 296/180.5 |
| 7,350,845 | B1 | * | 4/2008 | Duffy | ......................... 296/76 |
| 2002/0125738 | A1 | * | 9/2002 | Pettey | ..................... 296/180.5 |
| 2004/0256885 | A1 | * | 12/2004 | Bui | ......................... 296/180.5 |
| 2005/0173943 | A1 | * | 8/2005 | Duffy | ................... 296/146.12 |
| 2006/0186698 | A1 | * | 8/2006 | Roth | ....................... 296/180.1 |
| 2007/0228771 | A1 | * | 10/2007 | Froeschle et al. | ........ 296/180.1 |
| 2007/0228772 | A1 | * | 10/2007 | Froeschle et al. | ........ 296/180.1 |
| 2007/0228773 | A1 | * | 10/2007 | Froeschle et al. | ........ 296/180.5 |
| 2007/0236044 | A1 | * | 10/2007 | Froeschle et al. | ........ 296/180.5 |
| 2007/0236045 | A1 | * | 10/2007 | Froeschle et al. | ........ 296/180.5 |
| 2007/0236046 | A1 | * | 10/2007 | Froeschle et al. | ........ 296/180.5 |
| 2008/0036173 | A1 | * | 2/2008 | Alguera | ...................... 280/407 |
| 2008/0061596 | A1 | * | 3/2008 | Brown et al. | ............. 296/180.1 |
| 2008/0211261 | A1 | * | 9/2008 | Wegener | ................. 296/180.5 |
| 2008/0277966 | A1 | * | 11/2008 | Vlahovic | ................. 296/180.1 |

\* cited by examiner

FOREIGN PATENT DOCUMENTS

JP    02006281 A  *  1/1990

*Primary Examiner*—Jason S Morrow
(74) *Attorney, Agent, or Firm*—Fitch, Even, Tabin & Flannery; John M. Naber

(57) ABSTRACT

Proposed is a functional device which is arranged on the outer side of a vehicle body, comprising a base element (18) and at least one pivoting element (20A) which is pivotable with respect to the base element (18) between two end positions. According to the invention, a multi-linkage mechanism is articulatedly connected to the base element (18), which multi-linkage mechanism comprises at least two linkages (24, 26) which are articulatedly connected with their ends remote from the base element (18) to the pivoting element (20A) which is pivotable with respect to the base element (18), with one of the linkages (24, 26) being connected to a drive device and with a spring device acting on at least one of the linkages (24, 26), which spring device is preloaded into the end positions of the pivoting element (20A) and counteracts the mass force of the latter.

7 Claims, 9 Drawing Sheets

FUNCTIONAL DEVICE WITH PIVOTABLE ELEMENT

CROSS REFERENCE TO RELATED APPLICATIONS

This invention relates to, and claims the benefit of priority from DE Application No. 10 2006 058 561.5, filed Dec. 12, 2006.

BACKGROUND OF THE INVENTION

1. Field of the Invention

The invention relates to a functional device which is arranged on the outer side of a vehicle body and comprises a base element and at least one pivoting element which is pivotable with respect to the base element between two end positions.

2. Related Art

A functional device of said type is for example embodied as an air guiding device which is arranged in the rear region of a motor vehicle, and is known from DE 10 2004 0303 571 A1. Said air guiding device comprises a base element, which is embodied as a spoiler body and which can be adjusted by means of an adjusting device between a retracted rest position and a deployed operating position, and two pivoting elements which are pivotable with respect to the base element, which pivoting elements can each be utilized as spoiler extensions and are pivoted outwards with respect to a vehicle longitudinal central plane into an operating position. By means of the spoiler extensions, it is possible on demand to vary the active surface by increasing or reducing the size of the approach-flow surface. When the air guiding device is moved into its rest position in which it is held in a rear-side body depression, the spoiler extensions are pivoted inwards so that the dimensions of the air guiding device are matched to the dimensions of the body depression.

SUMMARY OF THE INVENTION

The invention is now based on the object of providing a functional device, which is arranged on the outer side of a vehicle body, of the generic type specified in the introduction, which functional device is provided with an adjusting device, which can be realized in a structurally simple manner and can be actuated with low drive forces, for the pivoting element. Said object is achieved according to the invention by the functional device arranged on the outer side of a vehicle body comprising a base element and at least one pivoting element which is pivotable with respect to the base element between two end positions, characterized in that a multi-linkage mechanism is articulatedly connected to the base element, which multi-linkage mechanism comprises at least two linkages which are articulatedly connected with their ends remote from the base element to the pivoting element which is pivotable with respect to the base element, with one of the linkages being connected to a drive device and with a spring device acting on at least one of the linkages, which spring device is preloaded into the end positions of the pivoting element and counteracts the mass force of the latter.

The essence of the invention is therefore that of providing a multi-linkage mechanism for pivoting the pivoting element with respect to the base element, which multi-linkage mechanism is preloaded by means of a spring device into the two end positions of the pivoting element, or the linkage of the multi-linkage mechanism is in each case preloaded in the direction of the in each case other end position. By means of the preload provided by the spring device, it is necessary for a drive device, such as an electric motor or the like, required for pivoting the pivoting element with respect to the base element, to impart a lower adjusting force than in an arrangement without a spring device, which in turn leads to a lower-power and therefore also lighter drive device. The spring device acts as a mass compensating spring which, in a specific design, counteracts the mass force exerted by the pivoting element in the respective end position. The force for holding the pivoting element in the respective end position can be applied either by the drive device itself or by a self-locking gearing. The spring device therefore assists the drive device in the adjustment of the pivoting element. When storing the pivoting element into one of the end positions, the spring device however has a braking effect, which advantageously leads to an equalization of the movement of the pivoting element.

A complete compensation of the mass force imparted by the pivoting element by the spring device can take place only in the end positions in the pivoting element, since the characteristic curve of the spring device is in particular linear, and the characteristic curve for adjusting the pivoting element follows an angular function.

In one specific embodiment, the functional element is an air guiding device which is attached in particular to the rear of the vehicle. The air guiding device can preferably be deployed from a rest position into an operating position. In this case, the air guiding device expediently has, as a base element, a spoiler body, with the pivoting element being a spoiler extension. Two spoiler extensions are preferably provided which can in each case be pivoted substantially in the vehicle transverse direction. The spoiler extensions are pivoted inwards with respect to a vehicle longitudinal central plane in one end position, and are pivoted outwards with respect to the vehicle longitudinal central line in the other end position. The spoiler extensions can be articulatedly connected to the upper side of the spoiler body. Alternatively, said spoiler extensions can also be articulatedly connected to the underside or the rear side of the spoiler body. In order to be able to realize movement profiles which follow a spherical surface, the multi-linkage mechanism is, in one specific embodiment of the functional element according to the invention, designed in such a way that its linkage axes intersect at a point. A so-called spherical multiple linkage is then provided.

In the present context, the term 'spoiler body' refers to an air guiding body which forms an aerodynamically active part of the air guiding device and is embodied for example as a rigid, substantially plate-shaped air guiding profile. The spoiler extensions can be embodied as shells which, in the state in which they are pivoted in the direction of the vehicle longitudinal central plane, lie in a form-fitting manner on or over the spoiler body.

In the case of one preferred functional device according to the invention which can be realized in a cost-effective manner, the spring device is a leg spring whose windings are arranged concentrically with respect to a pivot axis of that linkage on which said leg spring acts. The windings are expediently seated on a base-element-side pivot axle of said linkage. The two legs or ends of the leg spring can, depending on the position of the linkage or of its pivoting element, be supported on a stop which is rigidly connected to the base element. In particular, in each case one of the legs of the leg spring is supported against the stop in the two end positions of the pivoting element, with the in each case other leg of the leg spring acting on the respective linkage of the pivoting element. The leg spring has the maximum preload in each of the two end positions, such that it counteracts the weight force exerted by the pivoting element. With a suitable design of the leg spring, one obtains weight compensation of 100% in the end positions. In the central position, the leg spring is relaxed and therefore exerts no forces on the system. In said position, the pin which is embodied as a driver and is fixed to the linkage is situated below or above the stop which is fixed to the base element.

In a central position of the linkage on which the leg spring acts, both legs of the leg spring preferably bear against the stop, with the leg spring then being substantially free from preload, which ensures a jerk-free pivoting movement of the pivoting element.

For the engagement of the legs of the leg spring, a driver for the leg spring leg is preferably formed on the linkage on which the leg spring acts. The driver is embodied in particular as a pin which is aligned parallel to the pivot axis of the respective linkage. If the pivoting element is placed into one of its two end positions, then the pin which is fixed to the linkage drives a spring leg, with the other spring leg being supported on the stop which is fixed to the spoiler body. During the pivoting of the spoiler extension between the end positions, the two legs of the leg spring perform in each case half of the pivoting angle in relation to the pivoting angle of the linkage, so that the leg spring can operate sufficiently with a limited number of windings, which in turn has a positive effect on the installation space which must be made available.

The drive of the multi-linkage mechanism, which is embodied in particular as a four-bar mechanism and whose linkage axes are aligned substantially in the vehicle longitudinal direction or, in the case of a spherical four-bar mechanism, are also aligned at an acute angle with respect to the vehicle longitudinal axis, and by means of which the spoiler extensions are connected to the spoiler body, takes place in particular by means of a rod which is connected to one of the linkages. In the deployed and the retracted position of the pivoting element with respect to the base element, the lever arm of the drive rod is at its smallest and the lever arm of the centre of gravity of the pivoting element is at its greatest. In said positions, it is thus necessary to apply the greatest forces in order to raise and pivot the pivoting element. In a central position of the pivoting element, the lever arm of the drive rod is at its greatest and the lever arm of the centre of gravity of the pivoting element is minimal. Here, only minimal forces are then necessary for driving the pivoting element. Without a spring device, the drive device for the pivoting element would have to be designed corresponding to the moment to be applied in the end positions. As a result of the spring device which assists the drive device, it is however possible to use a lower-power and therefore also smaller and lighter motor.

If that linkage which is preloaded by means of the spring device, which is embodied as a leg spring, is the non-driven, outer linkage with respect to the vehicle longitudinal central plane, it can be obtained that the entire drive chain is preloaded by the spring device, and any possible play in the overall system is effectively counteracted.

Further advantages and advantageous embodiments of the subject matter according to the invention can be gathered from the description, from the drawing and from the patent claims.

An exemplary embodiment of a motor vehicle having an air guiding device embodied according to the invention is illustrated in schematically simplified form in the drawing and is explained in more detail in the following description. In the drawing:

BRIEF DESCRIPTION OF THE DRAWINGS

FIG. 12 shows the linkage when the spoiler extension is pivoted in.

DETAILED DESCRIPTION OF THE PREFERRED EMBODIMENTS

Figure 1:
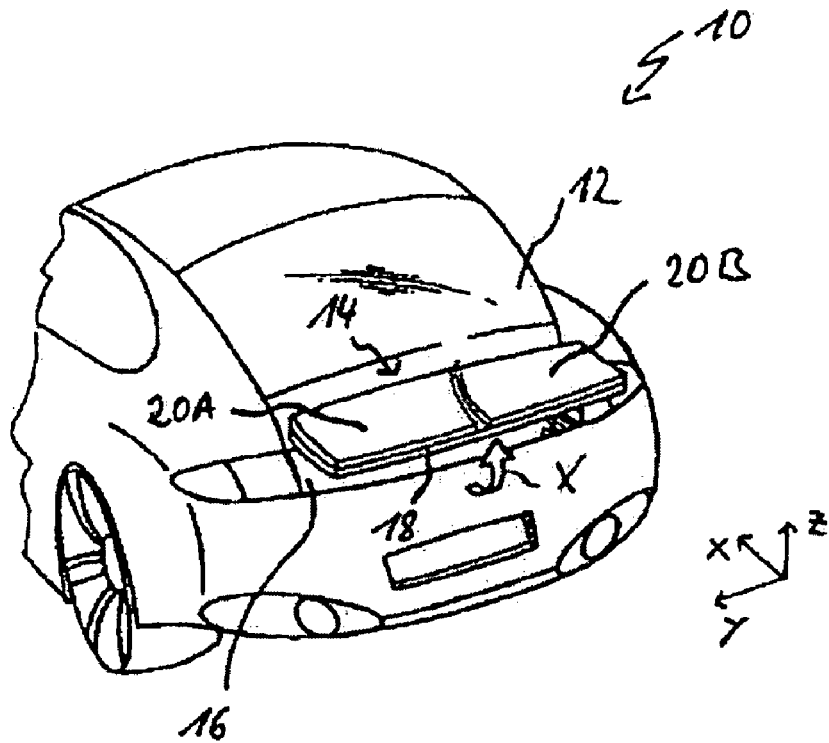
FIG. 1 shows a perspective rear view of a motor vehicle having a rear-side air guiding device.
Figure 2:
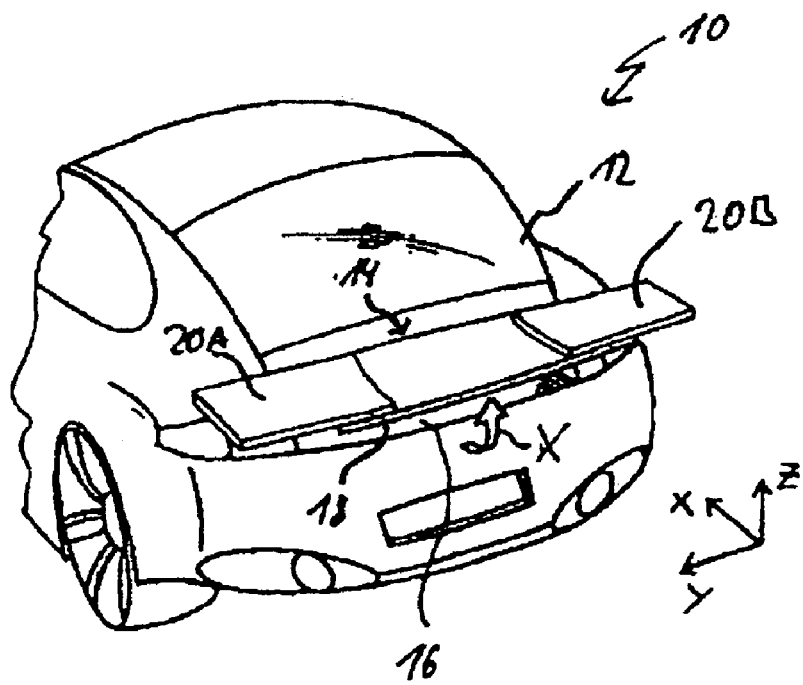
FIG. 2 shows a view corresponding to FIG. 1, but with pivoted-out spoiler extensions.

FIGS. 1 and 2 illustrate a motor vehicle 10 which has, in the rear region below a rear window 12, an air guiding device 14 which constitutes a rear spoiler. The air guiding device 14 can be moved, as per the arrow X, between a rest position, in which it is received in a body depression 16, and the operating position illustrated in FIGS. 1 and 2.

The air guiding device 14 which extends in the vehicle transverse direction Y, comprises a centrally arranged spoiler body 18 and two spoiler extensions 20A and 20B which are arranged mirror-symmetrically with respect to a vehicle longitudinal central plane and can be pivoted between a rest position illustrated in FIG. 1, in which they overlap substantially the entire area of the spoiler body 18, and an operating position illustrated in FIG. 2, in which they enlarge the approach-low surface of the air guiding device 14 in the vehicle transverse direction, so that the approach-flow surface of the air guiding device 14 is formed by the upper sides of the two spoiler extensions 20A and 20B and by the spoiler body 18.

The movement of the air guiding device 14 out of the rest position, in which it is arranged in the recess or body depression 16, into the operating position illustrated in FIGS. 1 and 2 takes place by means of an electric motor (not illustrated in any more detail) and a kinematic arrangement (likewise not illustrated in any more detail).

The pivoting of the spoiler extensions 20A and 20B, which are also referred to as spoiler flaps, takes place in each case by means of a spherical four-bar mechanism 22 which is explained below with reference to FIGS. 6 to 12 with regard to the spoiler extension 20A. The pivoting of the spoiler extension 20B which is formed mirror-symmetrically with respect to the spoiler extension 20A takes place in an analogous fashion and is therefore not explained in any more detail.

The four-bar mechanism 22 comprises an outer linkage 24 with respect to the vehicle longitudinal central plane and an inner linkage 26 with respect to the vehicle longitudinal central plane. The two linkages 24 and 26 are articulatedly connected, with their ends illustrated at the bottom in FIG. 6, in each case to the spoiler body 18, and with their ends illustrated at the top in FIG. 6, in each case to the spoiler extension 20A. The inner linkage 26 is connected to a drive rod 28 which is coupled by means of a gearing (not illustrated in any more detail) to a drive motor and can thereby introduce an adjusting force into the inner linkage 26.

The inner linkage 26 is articulatedly connected to a bracket 30 of the spoiler body 18 which forms a base element. Formed in the region of the bracket 30 is a pivot bearing 34, which is formed by a bolt 32, of the inner linkage 26. Arranged on the bolt 32 concentrically with respect to the pivot axis are, as an elongation of the pivot bearing 34, windings 36 of a leg spring 38 which constitutes a spring device. The leg spring 38 is mounted so as to be rotationally fixed with respect to the bracket 30.

Figure 8:
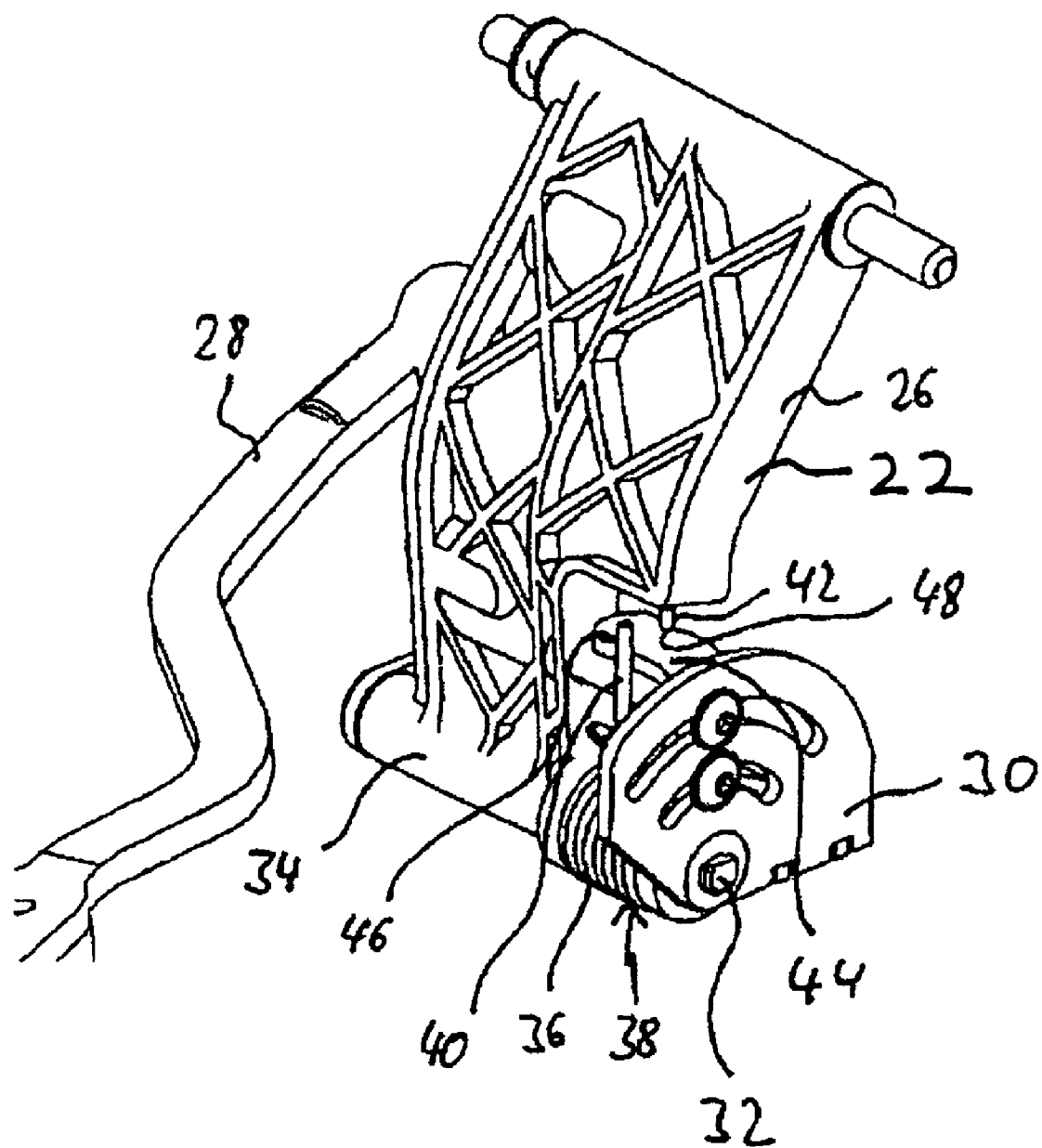
FIG. 8 shows a perspective side view of the linkage in an intermediate position of the respective spoiler extension.

The leg spring 38 has two leg springs 40 and 42 which, in the intermediate position of the inner linkage 26 illustrated in FIG. 8, bear in each case against a stop 44 which is formed as a tongue and which is fixedly connected to the bracket 30 and on which is formed a notch 46 and 48 for each of the spring legs 40 and 42. In said intermediate position, the leg spring 38 is substantially free from preload.

Figure 9:
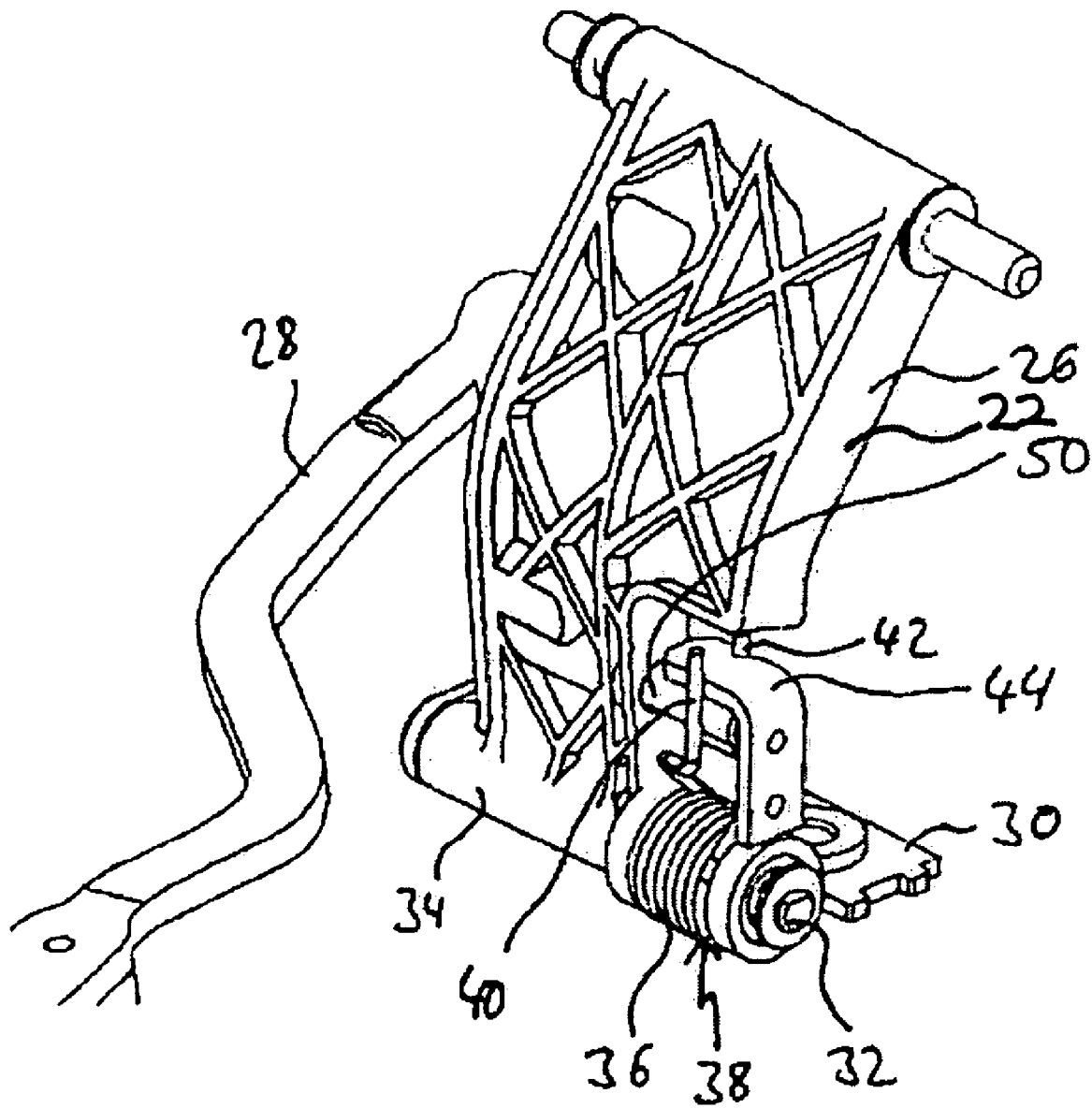
FIG. 9 shows a view corresponding to FIG. 8, but without a fastening lug for a leg spring stop.
Figure 10:
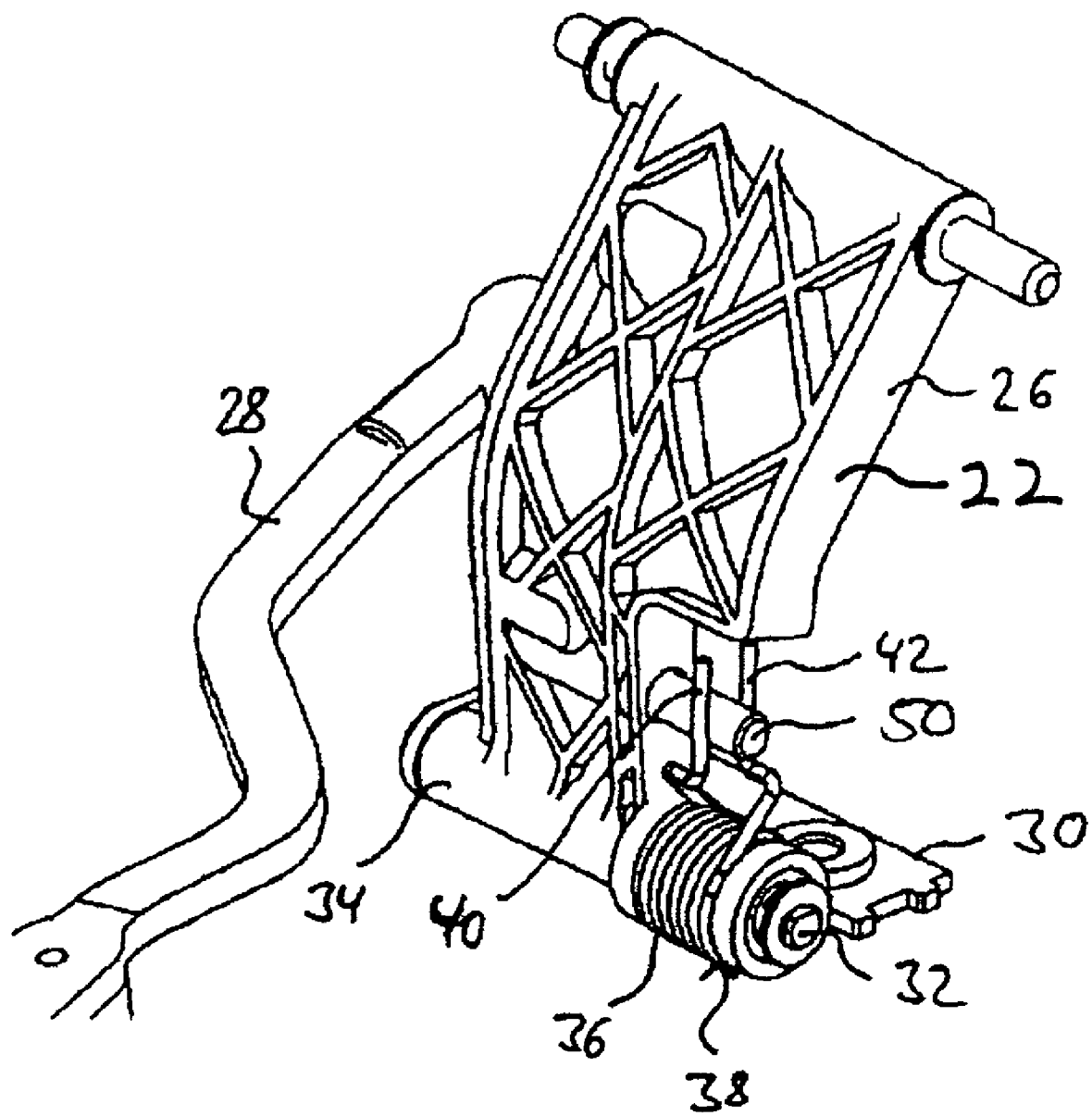
FIG. 10 shows a view corresponding to FIG. 9, but without an illustration of the leg spring stop.

The inner linkage 26 has a pin 50 which serves as a driver for the leg springs 40 and 42 and which is aligned substantially parallel to the pivot axis of the linkage 26, which pin 50, in the intermediate position illustrated in FIGS. 8 to 10, is arranged below the tongue-shaped stop 44 between the two spring legs 40 and 42, with the spring legs 40 and 42 likewise bearing substantially without preload against said pin 50.

The leg spring 38 operates in the manner described below.

Figure 3:
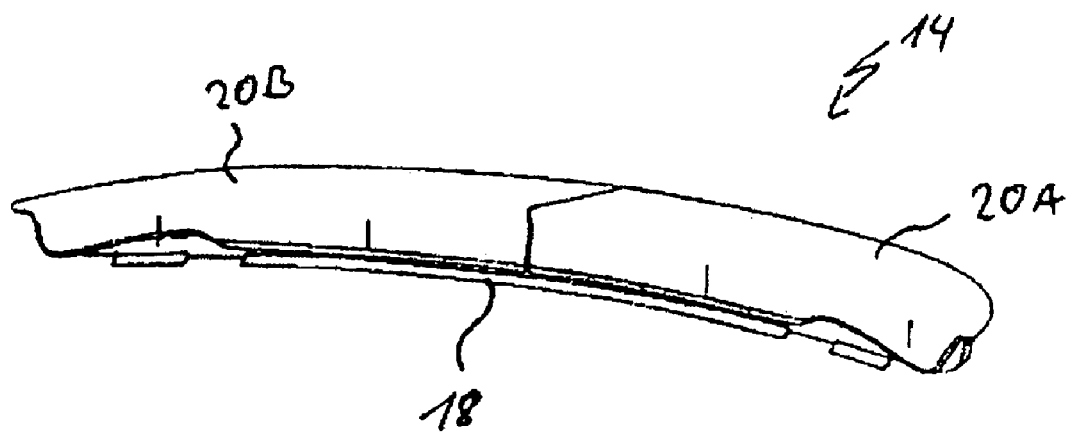
FIG. 3 shows the air guiding device individually with pivoted-in spoiler extensions.
Figure 4:
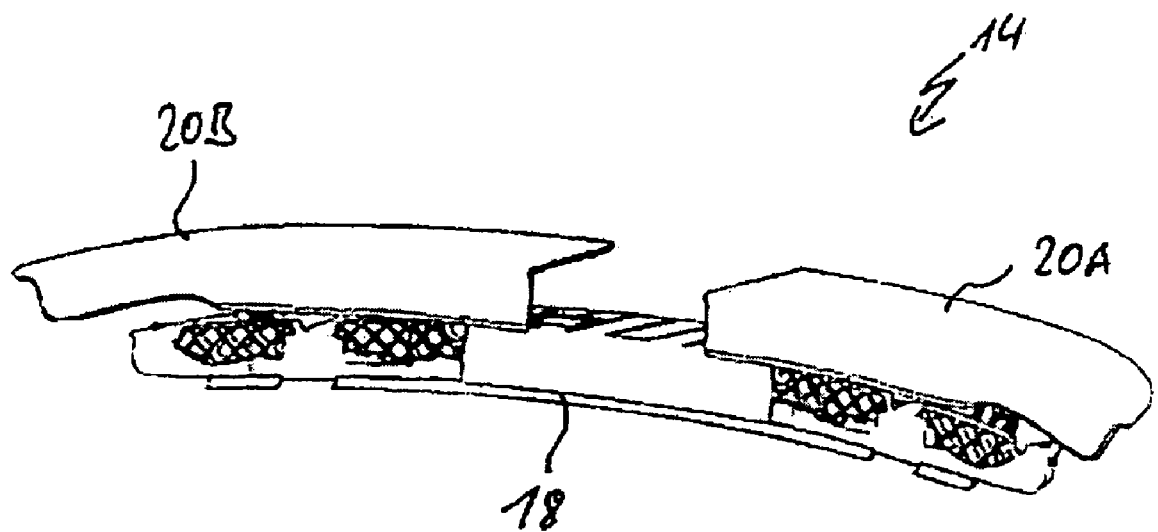
FIG. 4 shows the air guiding device during the pivoting of the spoiler extensions.
Figure 5:
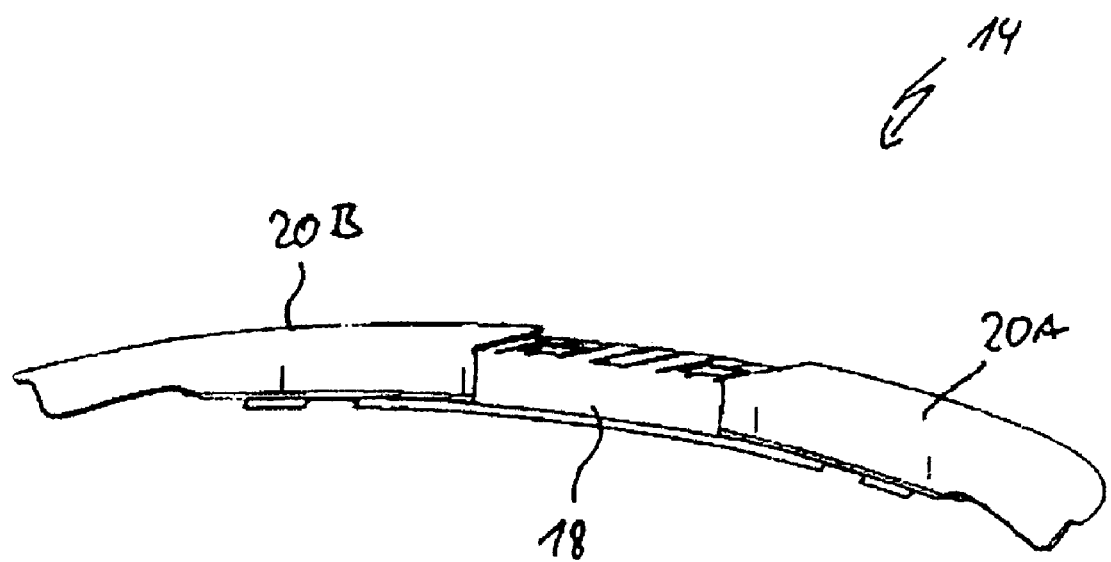
FIG. 5 shows the air guiding device with the spoiler extensions pivoted out.
Figure 6:
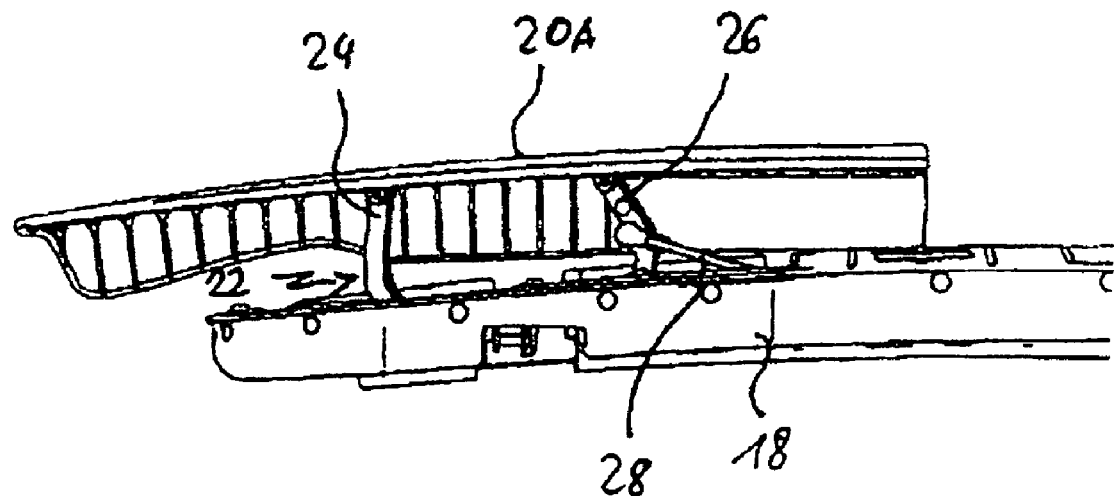
FIG. 6 shows a detailed view of the air guiding device in an intermediate position of the spoiler extensions.
Figure 7:
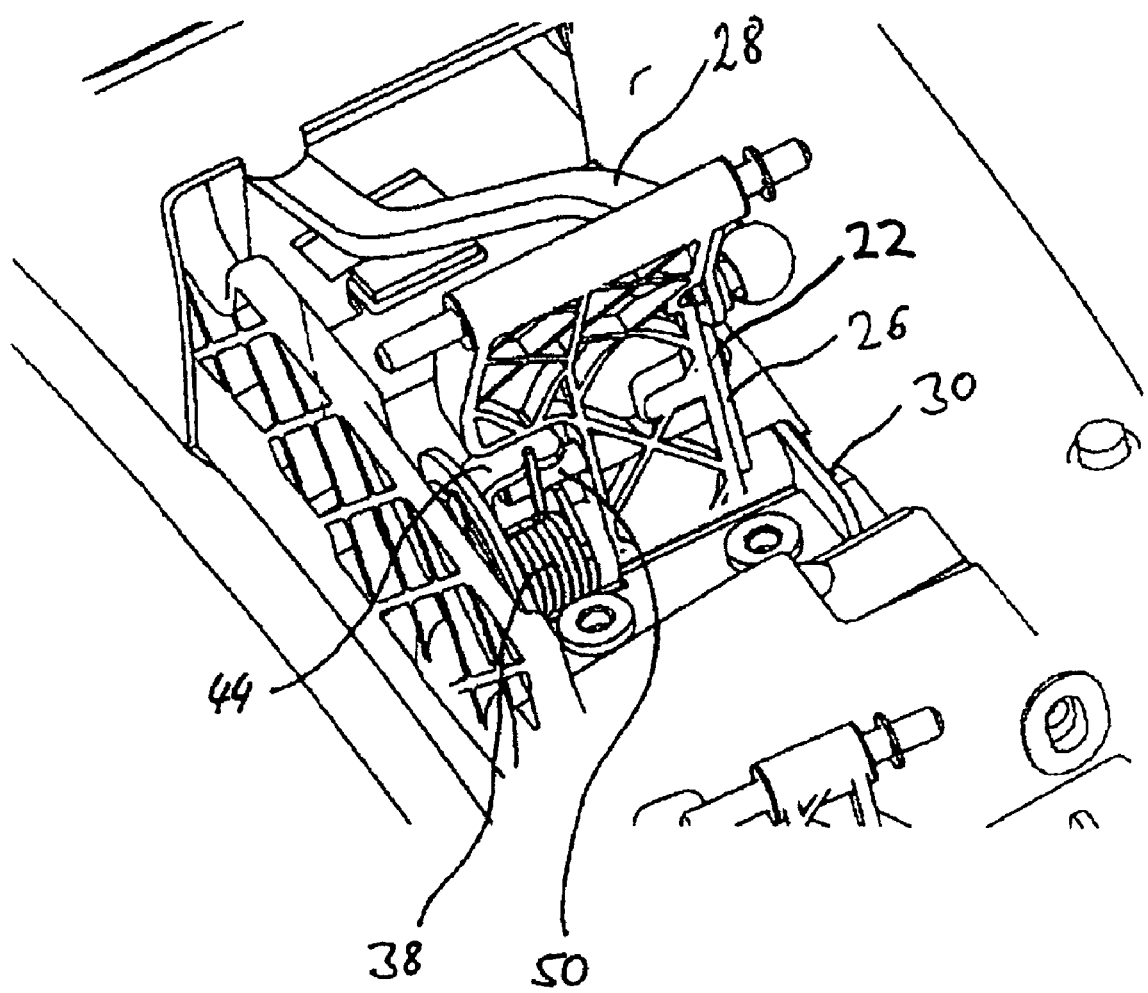
FIG. 7 shows a perspective plan view of a linkage for adjusting one of the spoiler extensions.
Figure 12:
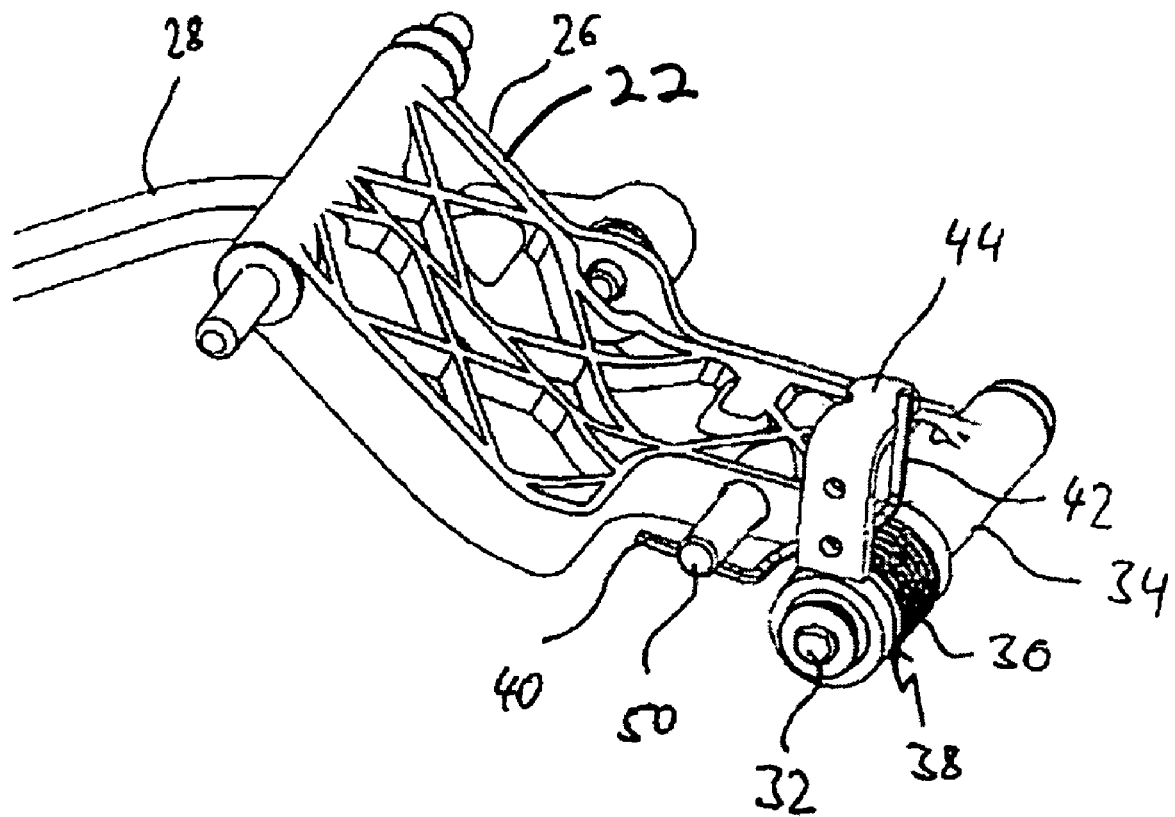

In the pivoted-in position, illustrated in FIG. 3, of the spoiler extension 20A which constitutes a pivoting element, which pivoted-in position corresponds to the linkage position illustrated in FIG. 12, the leg spring 38 has a maximum preload as a result of the spring leg 40 bearing against the driver pin 50 and being pivoted and the spring leg 42 being arranged in the associated notch 48 of the stop 44. The preload of the leg spring 38 therefore acts counter to the mass force exerted by the spoiler extension 20A on the inner linkage, so that the drive motor need apply only small forces in order to pivot the spoiler extension 20A from the pivoted-in rest position in the direction of the pivoted-out operating position. During pivoting of the linkage 26, the preload of the leg spring 38 decreases until the spring leg 40 comes to rest in the notch 46 of the stop 44.

Figure 11:
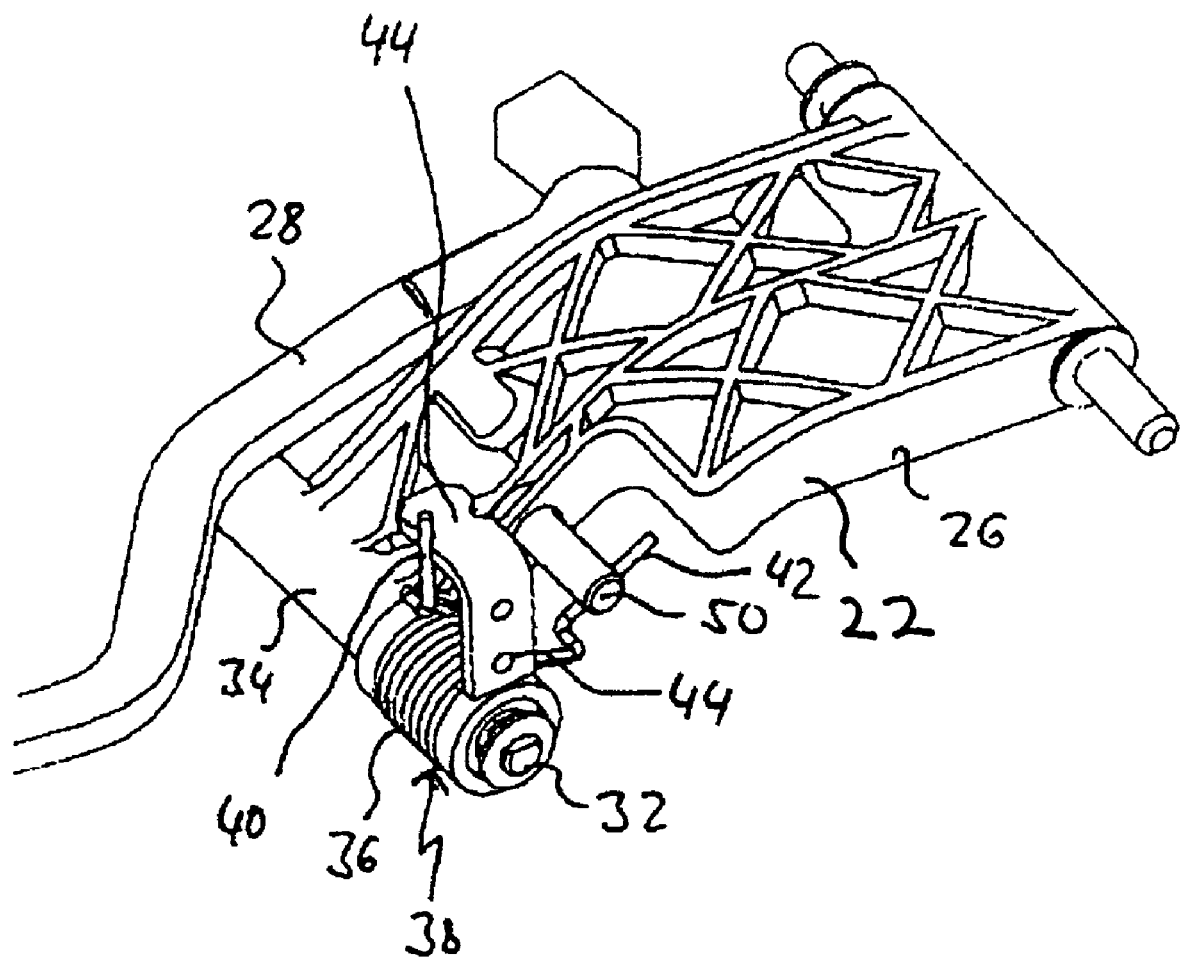
FIG. 11 shows the linkage when the spoiler extension is deployed.

If the linkage 26 is now pivoted further in the direction of the pivoted-out operating position of the spoiler extension 20A, the driver pin 50 drives the second spring leg 42 until the position of the inner linkage 26 illustrated in FIG. 11 is reached in which the preload of the leg spring 38 is a maximum. Since the mass force exerted by the spoiler extension 20A and the spring force of the leg spring 38 which counteracts said mass force at maximum preload of the leg spring 38 are approximately equal, it is also necessary for only small forces to be applied by the drive motor in order to preload the leg spring 38.

During the pivoting of the spoiler extension 20A back into the rest position, the leg spring 38 has a reversed course of movement.

During the pivoting of the spoiler extension 20A between the end positions, the two spring legs 40 and 42 of the leg spring 38 perform in each case half of the pivoting angle in relation to the pivoting angle of the inner linkage 26, so that the leg spring 38 can operate sufficiently with a limited number of windings, which in turn has a positive effect on the installation space which must be made available.

What is claimed is:

1. A functional device which is arranged on the outer side of a vehicle body, comprising:
   a base element and at least one pivoting element which is pivotable with respect to the base element between two end positions, characterized in that a multi-linkage mechanism is articulatedly connected to the base element, which multi-linkage mechanism comprises at least two linkages which are articulatedly connected with their ends remote from the base element to the pivoting element which is pivotable with respect to the base element, with one of the linkages being connected to a drive device and with a spring device acting on at least one of the linkages, which spring device is preloaded into end positions of the pivoting element and counteracts the mass force of the pivoting element;
   wherein the spring device is a leg spring whose windings are arranged concentrically with respect to a pivot axis of that linkage on which said leg spring acts;
   wherein a stop is provided which is rigidly connected to the base element and against which is supported, in two end positions of the pivoting element, in each case one leg of the leg spring, with the in each case other leg of the leg spring acting on a respective link; and
   wherein in a central position of the linkage on which the leg spring acts, both legs of the leg spring bear against the stop, and the leg spring is substantially free from preload.

2. A functional device which is arranged on the outer side of a vehicle body, comprising:
   a base element and at least one pivoting element which is pivotable with respect to the base element between two end positions, characterized in that a multi-linkage mechanism is articulatedly connected to the base element, which multi-linkage mechanism comprises at least two linkages which are articulatedly connected with their ends remote from the base element to the pivoting element which is pivotable with respect to the base element, with one of the linkages being connected to a drive device and with a spring device acting on at least one of the linkages, which spring device is preloaded into end positions of the pivoting element and counteracts the mass force of the pivoting element;
   wherein the spring device is a leg spring whose windings are arranged concentrically with respect to a pivot axis of that linkage on which said leg spring acts;
   wherein said functional device is an air guiding device which is arranged in particular at the rear of the vehicle; and
   wherein the base element is a spoiler body and the pivoting element is a spoiler extension.

3. The functional device of claim 2, characterized in that the spoiler extension is pivotable substantially in the vehicle transverse direction.

4. The functional device of claim 2, characterized in that the spoiler body is provided with the drive device for deploying the air guiding device.

5. The functional device of claim 2, characterized in that the spoiler extension is pivoted inwards with respect to a vehicle longitudinal central plane in one end position, and is pivoted outwards with respect to the vehicle longitudinal central plane in a second end position.

6. The functional device of claim 2, characterized in that the spoiler extension is articulatedly connected to an upper side of the spoiler body.

7. The functional device of claim 5, characterized in that the spring device acts on an outer linkage with respect to the vehicle longitudinal central plane.

* * * * *